(12) United States Patent
Liang et al.

(10) Patent No.: US 10,912,168 B2
(45) Date of Patent: Feb. 2, 2021

(54) LED LIGHT APPARATUS

(71) Applicant: XIAMEN ECO LIGHTING CO. LTD., Xiamen (CN)

(72) Inventors: Dejuan Liang, Xiamen (CN); Qiyuan Wang, Xiamen (CN); Liangliang Cao, Xiamen (CN); Yi Yang, Xiamen (CN); Xueqiong Chen, Xiamen (CN)

(73) Assignee: XIAMEN ECO LIGHTING CO. LTD., Xiamen (CN)

( * ) Notice: Subject to any disclaimer, the term of this patent is extended or adjusted under 35 U.S.C. 154(b) by 31 days.

(21) Appl. No.: 16/189,112

(22) Filed: Nov. 13, 2018

(65) Prior Publication Data

US 2020/0092961 A1   Mar. 19, 2020

(30) Foreign Application Priority Data

Sep. 14, 2018   (CN) .................... 2018 2 1504685 U

(51) Int. Cl.
| | |
|---|---|
| *F21V 13/00* | (2006.01) |
| *H05B 45/00* | (2020.01) |
| *G02B 27/09* | (2006.01) |
| *F21V 29/70* | (2015.01) |
| *G02B 6/42* | (2006.01) |
| *F21V 8/00* | (2006.01) |

(52) U.S. Cl.
CPC ............ *H05B 45/00* (2020.01); *F21V 29/70* (2015.01); *G02B 6/0025* (2013.01); *G02B 6/4236* (2013.01); *G02B 27/0955* (2013.01)

(58) Field of Classification Search
CPC .................................................. F21Y 2103/33
See application file for complete search history.

(56) References Cited

U.S. PATENT DOCUMENTS

| | | | | | |
|---|---|---|---|---|---|
| 4,949,226 | A * | 8/1990 | Makita | ..................... | F21S 41/24 362/538 |
| 5,897,201 | A * | 4/1999 | Simon | ..................... | G02B 6/003 362/268 |
| 6,789,929 | B1 * | 9/2004 | Doong | ................. | B60Q 1/0052 362/511 |
| 7,118,253 | B1 * | 10/2006 | Simon | ..................... | F21V 11/06 362/328 |
| 7,753,550 | B2 * | 7/2010 | Engel | ..................... | F21V 7/0016 362/147 |
| 8,899,783 | B1 * | 12/2014 | Simon | .................. | G02B 6/0011 362/235 |
| 9,239,142 | B2 * | 1/2016 | Quilici | ...................... | F21S 8/04 |
| 9,618,678 | B1 * | 4/2017 | Tickner | .................... | G02B 6/00 |

(Continued)

*Primary Examiner* — Andrew J Coughlin
(74) *Attorney, Agent, or Firm* — Chun-Ming Shih; Lanway IPR Services

(57) ABSTRACT

A LED light apparatus includes a central beam module, a peripheral light module, a support housing and a cap. The central beam module has a beam lens for converting a first light to form a light beam. The peripheral light module has a light passing ring. The light passing ring surrounds the beam lens for converting a second light to form a peripheral light. The peripheral light has a lower intensity strength than the light beam. The support housing fixes the central beam module and the peripheral light module. The cap is fixed to the support housing for plugging in an external socket for getting an external power supply.

18 Claims, 8 Drawing Sheets

(56) References Cited

U.S. PATENT DOCUMENTS

| | | | | |
|---|---|---|---|---|
| 2004/0047161 | A1* | 3/2004 | Mochizuki | F21S 43/14 362/511 |
| 2009/0086480 | A1* | 4/2009 | Chen | F21V 13/04 362/235 |
| 2012/0014128 | A1* | 1/2012 | Lin | G02B 6/0021 362/580 |
| 2012/0230027 | A1* | 9/2012 | Boomgaarden | F21V 7/041 362/235 |
| 2013/0003409 | A1* | 1/2013 | Vissenberg | G02B 6/0018 362/606 |
| 2013/0021823 | A1* | 1/2013 | Yamagami | F21V 13/04 362/613 |
| 2013/0107517 | A1* | 5/2013 | Shih | F21K 9/60 362/235 |
| 2013/0155719 | A1* | 6/2013 | Brott | F21K 9/61 362/609 |
| 2013/0215622 | A1* | 8/2013 | Wang | F21S 8/026 362/311.02 |
| 2013/0221846 | A1* | 8/2013 | Alexiou | F21V 29/75 315/51 |
| 2014/0211497 | A1* | 7/2014 | Yuan | F21K 9/233 362/555 |
| 2014/0313765 | A1* | 10/2014 | Nelson | G02B 6/0096 362/555 |
| 2015/0184809 | A1* | 7/2015 | Kuo | F21V 13/02 362/311.14 |
| 2015/0233534 | A1* | 8/2015 | Kaiser | G01J 1/0414 250/234 |
| 2015/0277030 | A1* | 10/2015 | Huang | F21V 3/04 362/611 |
| 2016/0061394 | A1* | 3/2016 | Yeo | F21S 6/005 362/294 |
| 2016/0320019 | A1* | 11/2016 | Gibbs | F21V 7/0008 |
| 2017/0322364 | A1* | 11/2017 | Girotto | G02B 6/0076 |
| 2019/0342975 | A1* | 11/2019 | Diana | F21V 23/0442 |

\* cited by examiner

LED LIGHT APPARATUS

FIELD OF INVENTION

The present invention is related to a LED light apparatus and more particularly related to a LED light apparatus with compact structures.

BACKGROUND

There are various lighting devices designed for satisfying different needs. For example, there are light bulbs to be installed on sockets. Such light bulbs are usually easy to be installed by users. For downlight devices used in normal home, it would be important to consider convenience for installation, safety and replacement.

Usually, LED light devices need certain driver circuits supplying proper driving currents to LED modules so as to make LED modules operating normally. Driver circuits occupy certain space and makes assembling of LED light devices more difficulty.

Therefore, it would be beneficial to provide designs that are easily to be installed, assembled, and thus even help decrease total cost. On the other hand, it would be even better if further advantages may be introduced in the same products.

SUMMARY OF INVENTION

According to an embodiment of the present invention, the LED light apparatus includes a central beam module, a peripheral light module, a support housing and a cap. In some other embodiments, the cap may be replaced with different structures for retrieving an external power source or an internal power source like a battery.

The central beam module has a beam lens for converting a first light to form a light beam. Specifically, the beam lens may condense light from one or more directions to focus into a light beam. The beam lens may be implemented as various structures. For example, a single convex lens, concave lens, multiple lens assembly, a lens with a lot of micro lens structures may be adopted, depending on different design requirements like cost or thickness of the LED light apparatus.

The peripheral light module has a light passing ring. The light passing ring is not necessary to be circular shape. Rectangular or other geometric enclosing shapes with an opening for exposing the light beam mentioned above may be referred as the light passing ring here.

The light passing ring surrounds the beam lens for converting a second light to form a peripheral light. The term "surround" mentioned here refer to an enclosing relation. Specifically, the light beam through the beam lens is passing from a light passing opening of the light passing ring. Therefore, the light passing ring does not have to physically enclose the beam lens. Instead, the light passing ring provides a light passing opening for the light beam of the beam lens, which is a way for the light passing ring to surround the beam lens.

The peripheral light generated by the light passing ring form a surrounding luminance source around the light beam. The peripheral light has a lower intensity strength than the light beam, which means the strength per area of the peripheral light is smaller than the light beam on surface of the LED light apparatus. The light beam provides an intensifying effect to emphasize an object while the peripheral light is used for providing general luminance effect.

Please be noted that in other embodiments, the intensity strength may not need to be a limitation, but some features may be combined with other features mentioned in this disclosure to form alternative embodiments, depending on different design needs.

There is a support housing for fixing the central beam module and the peripheral light module. The support housing may be made of one piece or multiple parts assembled together. The relative positions like the beam lens, the light passing ring and the cap are fixed by the support housing. The support housing may be made of plastic, metal or any combination of various materials.

In this embodiment, the cap is fixed to the support housing for plugging in an external socket for getting an external power supply. In some embodiments, the cap has two electrodes for receiving an alternating current like 110V or 220V standard power source via an Edison standard socket.

Similarly, the cap may be canceled and the features of the invention may be combined into other embodiments, depending on design needs.

In some embodiments, the LED light apparatus includes a first light module for generating the first light and includes a second light module for geniting the second light. The first light module and the second light module are two separate LED components. For example, the first light module and the second light module may have different optical characteristics, power parameters, luminance parameters and even may be controlled separately by providing two separate control signals.

Alternatively, one LED module may be used in the LED light apparatus. In such case, the single LED module provides both the first light and the second light respectively into the beam lens and the light passing ring.

In some embodiments, the peripheral light module includes a light guide for distributing the second light from a LED ring to emit from a front side of the light passing ring. In some embodiments, the light guide may be a circular disk shape with a central opening so that the light beam of the beam lens may pass through.

In some embodiments, LED modules are disposed at a lateral side of the light guide so that a front surface of the light guide emits light. When the light guide is a circular disk as mentioned above, the LED modules may be disposed at inner lateral side or exterior lateral side. More specific examples are explained as follows.

As mentioned above, the "ring" is not necessary to be circular. Furthermore, the inner side and the exterior side of the light guide may have different shapes. For example, the inner side of the light guide is circular while the exterior side of the light guide has a polygonal shape like a rectangular shape.

The light guide may be made of PMMA or PC material, disposing predetermined grooves or other structures so that entered light may be reflected, refracted, or directed to escape the light guide via predetermined positions. In some embodiments, the light guide has a front side and a back side and both sides may provide light to escape therefrom.

In some embodiments, the back side of the LED ring also emits light. In other words, the back side of the LED light apparatus also provides luminance, making output light more soft and increasing overall luminance efficacy.

In some embodiments, the LED ring has a ring belt mounted with a second light module, e.g. LED modules. The ring belt surrounds the beam lens. The light guide surrounds the ring belt. As mentioned above, the term "surround" may refer to an enclosing relation, in certain projection aspect. For example, the ring belt may not be surrounding the beam lens in a three-dimension space, but still surrounds the beam lens from a top view as a two-dimension aspect. Such configuration still fits the definition of the term "surround" used in this disclosure.

In some embodiments, there is a cover ring exposing the beam lens and concealing the LED ring. This prevents unnecessary light leak and makes the overall appearance more appealing.

In some embodiments, there is a light guide ring covering an exterior lateral side of the light guide. The light guide ring may help protect the light guide and also improves overall appearance. The light guide ring may be made of elastic material or other material.

In some embodiments, the light guide ring comprises a top ring cover and a bottom ring cover together covering the exterior lateral side of the light guide.

In some embodiments, there is a reflective layer on a back side of the peripheral ring for reflecting a part of the second light back to the front side of the light passing ring. As mentioned above, the back side of the peripheral ring may be exposed and allow light to escape to form part of the peripheral light. In this case, the back side of the peripheral ring is covered with a reflective layer or cover to reflecting light back to the light guide so that more light may be escaped from the front side of the peripheral ring.

In some embodiments, there is a diffusion layer covering the front side of the light passing ring. The diffusion layer may help soften the light output to prevent undesired light output visual appearance of the light guide.

In some embodiments, the first light and the second light are controlled separately. As mentioned above, there may be one light module or two light modules for providing the first light and the second light. In some embodiments, when the first light and the second light may be operated separately, there may be multiple statuses of the LED light apparatus.

For example, the LED light apparatus may be controlled to show only the light beam, the peripheral ring light or both.

Although the first light and the second light may be operated separately in some embodiments, the first light may be designed to relate to the second light in certain predetermined logic. For example, when both the first light and the second light are turned on, the first light may have a first luminance level, which is different when the second light is turned off. Such design makes the luminance effect more flexible and more intelligent.

In some embodiments, the LED light apparatus may include a light source support. An exterior wall of the light source support is attached with a LED ring emitting the second light. An inner bottom of the light source support is attached with a LED plate for emitting the first light.

For example, the light source support may have a cup shape. The lateral wall of the cup shape light source support may be attached with the LED ring for emitting the second light. The inner bottom of the cup shape light source support may be attached with a LED plate for emitting the first light. Wires may be disposed on the light source support for connecting further to driver circuits or an external power source.

In some embodiments, the beam lens is fixed above the LED plate to the light source support, so that the first light of the LED plate forms a light beam.

In some embodiments, the LED light apparatus may include a top fixing ring. The top fixing ring and the light source support clip an inner edge of the light guide for fixing the light guide. In other words, the light source support and the top fixing ring together holds the light guide while allowing the light beam to escape via a central light pass opening of the top fixing ring.

In some embodiments, the light source support is a heat sink device, e.g. made of heat dissipation material like metal, plastic, or combination of multiple materials. The light source support is close to the major heat source and such design helps improve robustness and life span of the LED light apparatus.

In some other embodiments, a LED ring is fixed to the support housing for generating the second light. A LED plate is fixed to the support housing for generating the first light. A fixing ring and the support housing clip the light guide to fix the light guide.

In such design, the support housing provides the function of the light source support directly. The support housing may be made of a one-process molding, thus saving more cost and further improve assembly convenience.

In some embodiments, an exterior lateral wall of the support housing has an inwardly curved shape. In other words, there is a curve line on the exterior lateral side of the support housing, gradually changing its tilt angle to form an inwardly curved shape.

This improves light output, e.g. more light movement from the back side of the light guide, as mentioned above. The exterior wall of the support housing may be applied with a reflective material for further improving overall luminance efficacy.

In some embodiments, a ratio of a lateral height of the support housing to a diameter of the light guide is more than 50%. This makes the LED light apparatus looking like a T shape structure from a lateral view and may be assembled to a light support more conveniently, also increasing overall luminance efficacy.

DETAILED DESCRIPTION

Please refer to FIG. 1, FIG. 2, FIG. 3, FIG. 4 and FIG. 5. These drawings illustrate an embodiment of the present invention.

Figure 1:
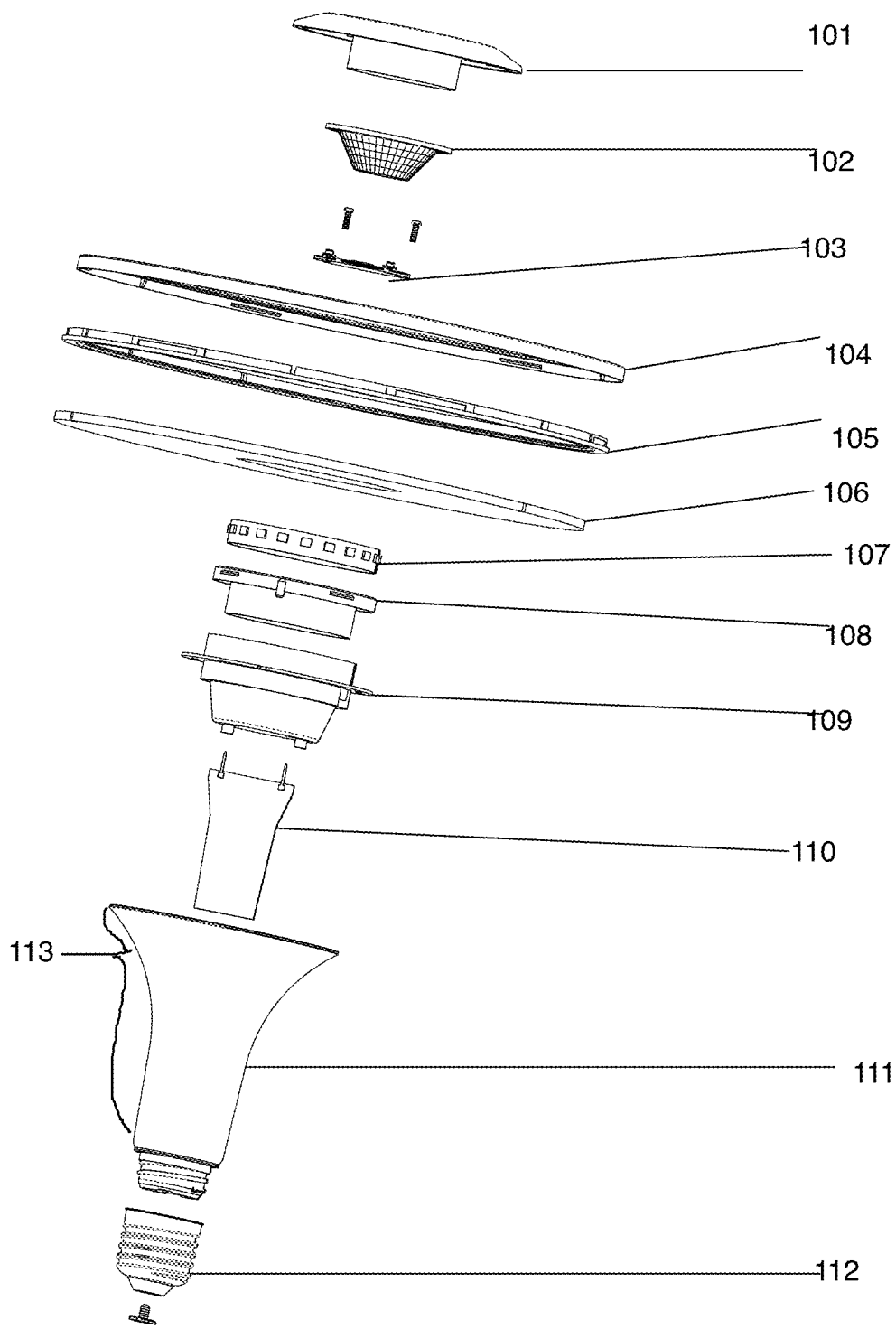
FIG. 1 illustrates an exploded view of a LED light apparatus embodiment.
Figure 3:
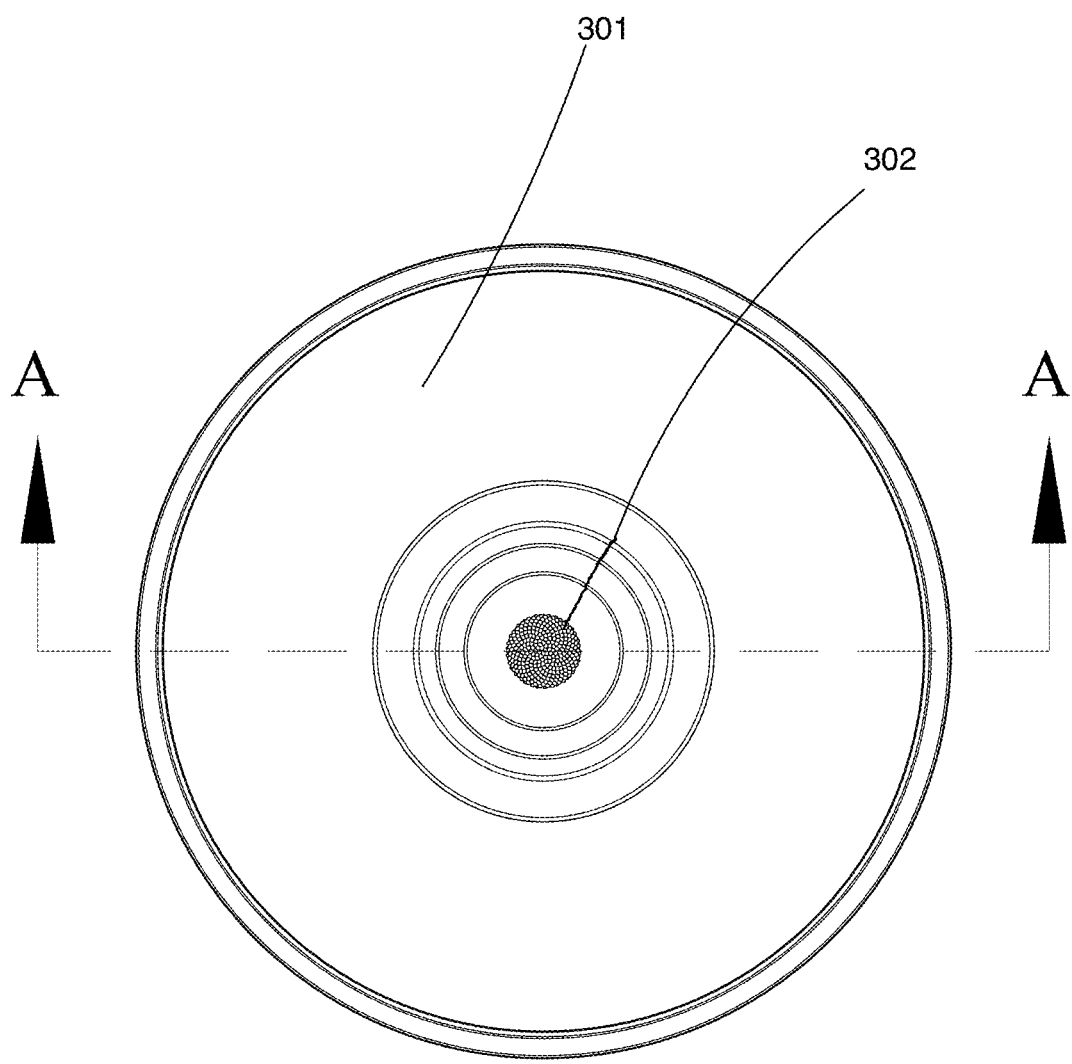
FIG. 3 illustrates a top view of FIG. 1.
Figure 4:
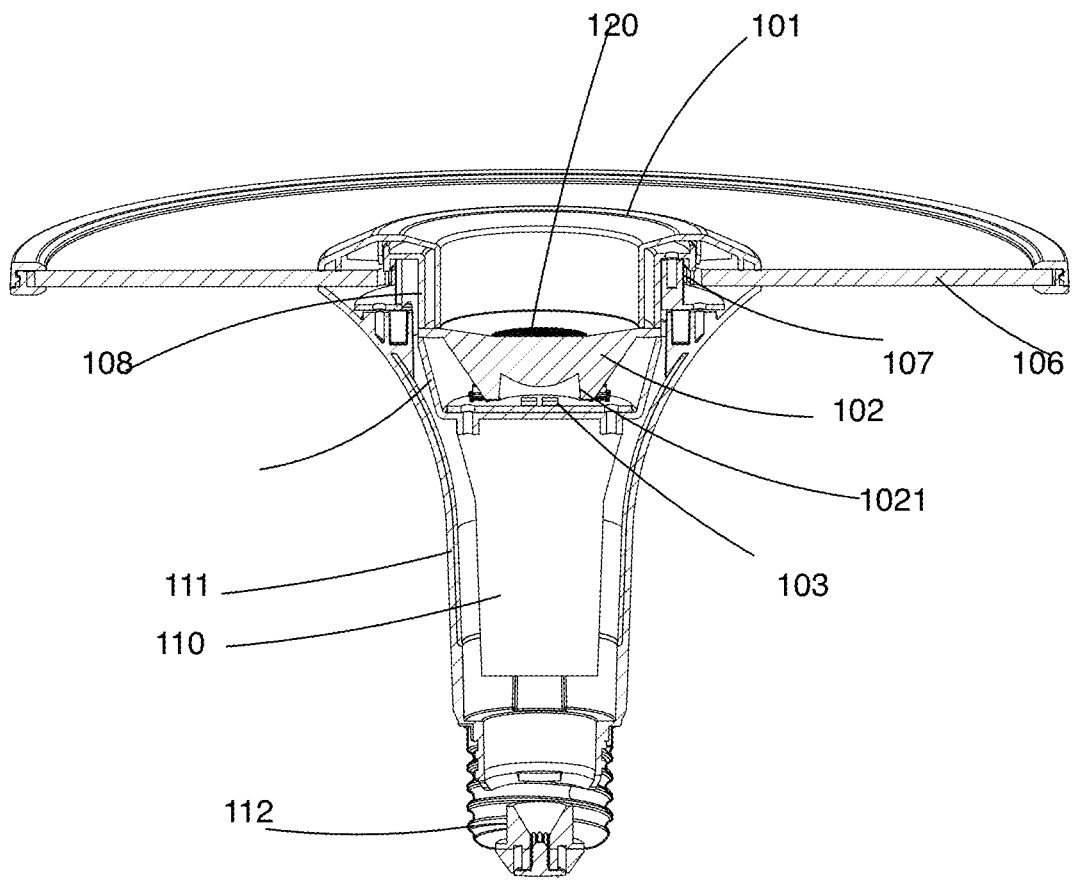
FIG. 4 illustrates cross-sectional view of FIG. 1 via the A-A line of FIG. 3.

FIG. 1 is an exploded view of the embodiment. FIG. 3 is a top view of the embodiment, showing a cross line A-A. FIG. 4 illustrates a cross-sectional view of the embodiment with the cross line A-A of FIG. 3.

In FIG. 1 and FIG. 4, the LED light apparatus has a cover ring 101, a beam lens 102, a LED plate 103, a top ring cover 104, a bottom ring cover 105, a light guide 106, a LED ring 107, a first light source support 108, a second light source support 109, a driver board 110, a support housing 111, and a cap 112.

The cover ring 101 has a central opening for exposing the beam lens while concealing the LED ring 107 below. The LED ring 107 emits a second light entering the light guide 106 to form a peripheral light. The light guide 106 has a front side and a back side, both emitting the peripheral light. The top ring cover 104 and the bottom ring cover 105 together forming a light guiding ring, clipping the exterior edge of the light guide 106.

The LED plate 103 emits a first light entering the beam lens 103 forming a light beam 120. The driver plate 110 may be plugged to the LED plate 103, also providing electricity to the LED ring 107. The cap 112 may be plugged into an Edison socket for receiving an external power source.

The first light source support 108 and the second light source support 109 may be made separately and form a light source support. The light source support may be even made of a one-piece component, or even integrated with the support housing 111.

The cover ring 101 may be modified for fixing the light guide 106 together with the support housing 111. There is an inwardly curved wall 113 on the lateral side of the support housing 111.

Figure 2:
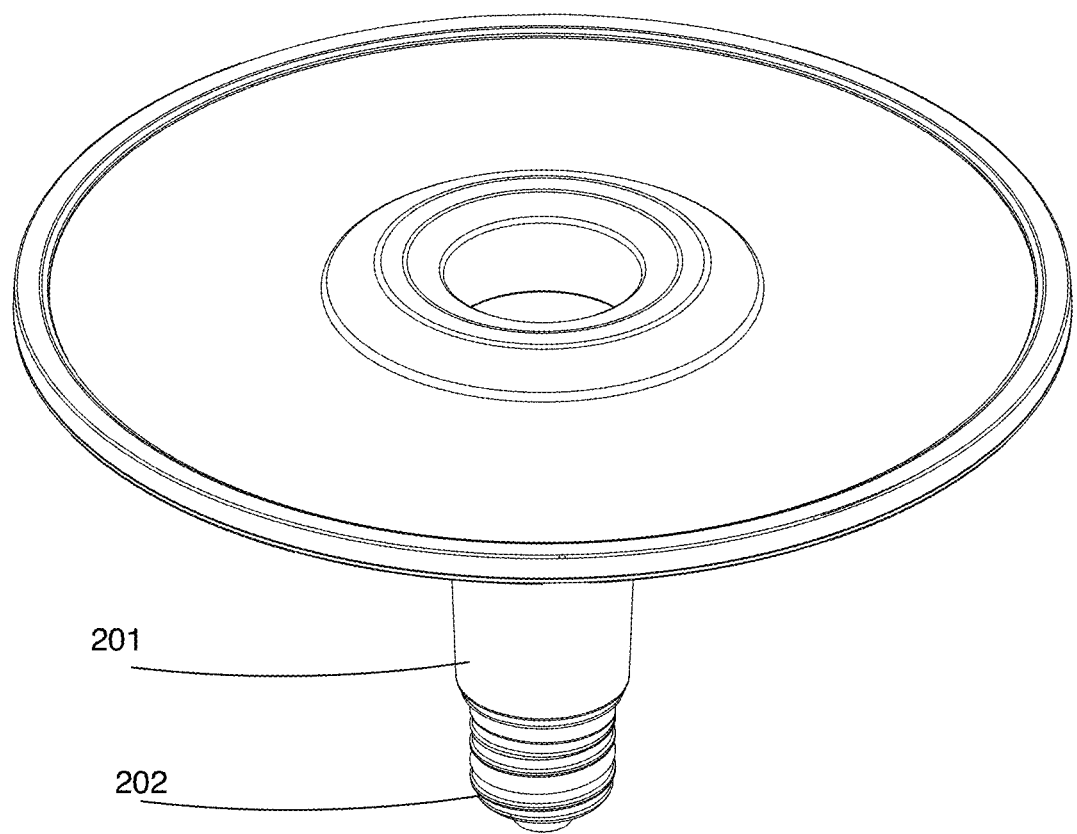
FIG. 2 illustrates a perspective view of an assembled result of FIG. 1.

Please refer to FIG. 2. The assembled result of the embodiment of FIG. 1 forms an elegant LED light apparatus with a main body 201 and a cap 202 that may be installed to a light support.

The light support may hold multiple such LED light apparatuses.

Please refer to FIG. 3. There is a light beam 302 and a peripheral light 301 provided from different portions of the LED light apparatus.

Figure 5:
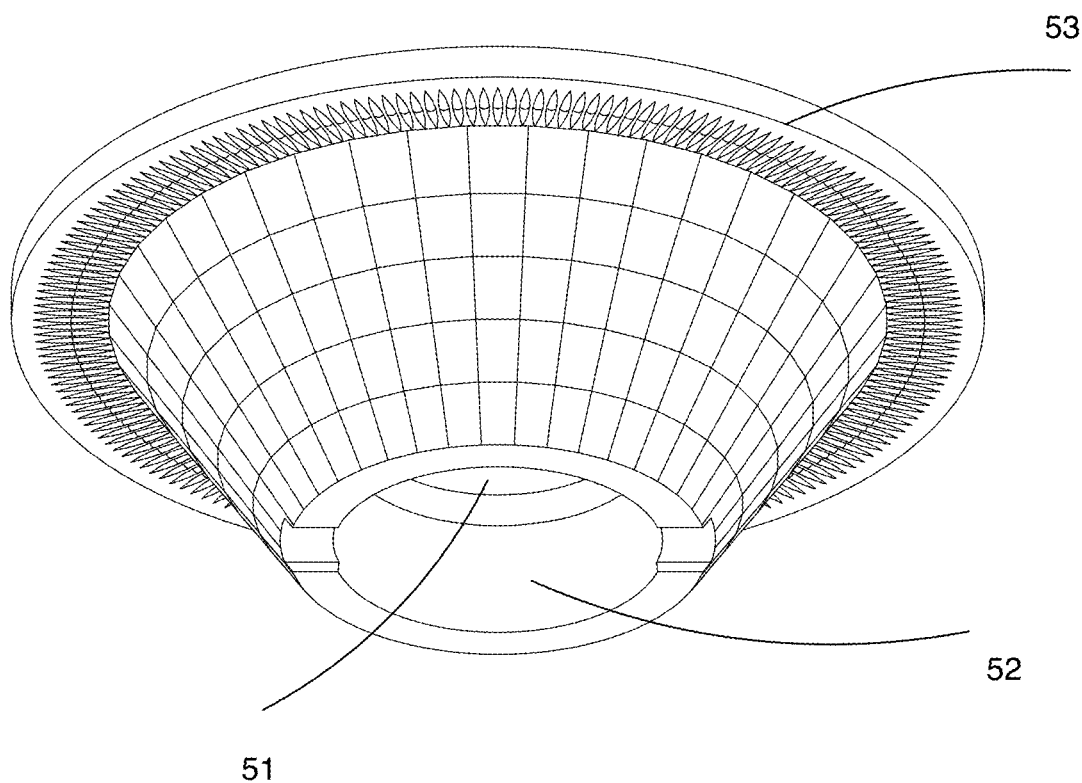
FIG. 5 illustrates a beam lens example.

Please refer to FIG. 5, which illustrates a beam lens example.

In FIG. 5, the beam lens has a receiving cavity 52 for allowing light entering the lens 51. The beam lens has a top edge 53 to be fixed to support housing directly or indirectly.

According to an embodiment of the present invention, the LED light apparatus includes a central beam module, a peripheral light module, a support housing and a cap. In some other embodiments, the cap may be replaced with different structures for retrieving an external power source or an internal power source like a battery.

The central beam module has a beam lens for converting a first light to form a light beam. Specifically, the beam lens may condense light from one or more directions to focus into a light beam. The beam lens may be implemented as various structures. For example, a single convex lens, concave lens, multiple lens assembly, a lens with a lot of micro lens structures may be adopted, depending on different design requirements like cost or thickness of the LED light apparatus.

The peripheral light module has a light passing ring. The light passing ring is not necessary to be circular shape. Rectangular or other geometric enclosing shapes with an opening for exposing the light beam mentioned above may be referred as the light passing ring here.

The light passing ring surrounds the beam lens for converting a second light to form a peripheral light. The term "surround" mentioned here refer to an enclosing relation. Specifically, the light beam through the beam lens is passing from a light passing opening of the light passing ring. Therefore, the light passing ring does not have to physically enclose the beam lens. Instead, the light passing ring provides a light passing opening for the light beam of the beam lens, which is a way for the light passing ring to surround the beam lens.

The peripheral light generated by the light passing ring form a surrounding luminance source around the light beam. The peripheral light has a lower intensity strength than the light beam, which means the strength per area of the peripheral light is smaller than the light beam on surface of the LED light apparatus. The light beam provides an intensifying effect to emphasize an object while the peripheral light is used for providing general luminance effect.

Please be noted that in other embodiments, the intensity strength may not need to be a limitation, but some features may be combined with other features mentioned in this disclosure to form alternative embodiments, depending on different design needs.

There is a support housing for fixing the central beam module and the peripheral light module. The support housing may be made of one piece or multiple parts assembled together. The relative positions like the beam lens, the light passing ring and the cap are fixed by the support housing. The support housing may be made of plastic, metal or any combination of various materials.

In this embodiment, the cap is fixed to the support housing for plugging in an external socket for getting an external power supply. In some embodiments, the cap has two electrodes for receiving an alternating current like 110V or 220V standard power source via an Edison standard socket.

Similarly, the cap may be canceled and the features of the invention may be combined into other embodiments, depending on design needs.

In some embodiments, the LED light apparatus includes a first light module for generating the first light and includes a second light module for geniting the second light. The first light module and the second light module are two separate LED components. For example, the first light module and the second light module may have different optical characteristics, power parameters, luminance parameters and even may be controlled separately by providing two separate control signals.

Alternatively, one LED module may be used in the LED light apparatus. In such case, the single LED module provides both the first light and the second light respectively into the beam lens and the light passing ring.

In some embodiments, the peripheral light module includes a light guide for distributing the second light from a LED ring to emit from a front side of the light passing ring. In some embodiments, the light guide may be a circular disk shape with a central opening so that the light beam of the beam lens may pass through.

In some embodiments, LED modules are disposed at a lateral side of the light guide so that a front surface of the light guide emits light. When the light guide is a circular disk as mentioned above, the LED modules may be disposed at inner lateral side or exterior lateral side. More specific examples are explained as follows.

As mentioned above, the "ring" is not necessary to be circular. Furthermore, the inner side and the exterior side of the light guide may have different shapes. For example, the inner side of the light guide is circular while the exterior side of the light guide has a polygonal shape like a rectangular shape.

The light guide may be made of PMMA or PC material, disposing predetermined grooves or other structures so that entered light may be reflected, refracted, or directed to escape the light guide via predetermined positions. In some embodiments, the light guide has a front side and a back side and both sides may provide light to escape therefrom.

In some embodiments, the back side of the LED ring also emits light. In other words, the back side of the LED light apparatus also provides luminance, making output light more soft and increasing overall luminance efficacy.

In some embodiments, the LED ring has a ring belt mounted with a second light module, e.g. LED modules. The ring belt surrounds the beam lens. The light guide surrounds the ring belt. As mentioned above, the term "surround" may refer to an enclosing relation, in certain projection aspect. For example, the ring belt may not be surrounding the beam lens in a three-dimension space, but still surrounds the beam lens from a top view as a two-dimension aspect. Such configuration still fits the definition of the term "surround" used in this disclosure.

In some embodiments, there is a cover ring exposing the beam lens and concealing the LED ring. This prevents unnecessary light leak and makes the overall appearance more appealing.

In some embodiments, there is a light guide ring covering an exterior lateral side of the light guide. The light guide ring may help protect the light guide and also improves overall appearance. The light guide ring may be made of elastic material or other material.

In some embodiments, the light guide ring comprises a top ring cover and a bottom ring cover together covering the exterior lateral side of the light guide.

In some embodiments, there is a reflective layer on a back side of the peripheral ring for reflecting a part of the second light back to the front side of the light passing ring. As mentioned above, the back side of the peripheral ring may be exposed and allow light to escape to form part of the peripheral light. In this case, the back side of the peripheral ring is covered with a reflective layer or cover to reflecting light back to the light guide so that more light may be escaped from the front side of the peripheral ring.

In some embodiments, there is a diffusion layer covering the front side of the light passing ring. The diffusion layer may help soften the light output to prevent undesired light output visual appearance of the light guide.

In some embodiments, the first light and the second light are controlled separately. As mentioned above, there may be one light module or two light modules for providing the first light and the second light. In some embodiments, when the first light and the second light may be operated separately, there may be multiple statuses of the LED light apparatus.

For example, the LED light apparatus may be controlled to show only the light beam, the peripheral ring light or both.

Although the first light and the second light may be operated separately in some embodiments, the first light may be designed to relate to the second light in certain predetermined logic. For example, when both the first light and the second light are turned on, the first light may have a first luminance level, which is different when the second light is turned off. Such design makes the luminance effect more flexible and more intelligent.

In some embodiments, the LED light apparatus may include a light source support. An exterior wall of the light source support is attached with a LED ring emitting the second light. An inner bottom of the light source support is attached with a LED plate for emitting the first light.

For example, the light source support may have a cup shape. The lateral wall of the cup shape light source support may be attached with the LED ring for emitting the second light. The inner bottom of the cup shape light source support may be attached with a LED plate for emitting the first light. Wires may be disposed on the light source support for connecting further to driver circuits or an external power source.

In some embodiments, the beam lens is fixed above the LED plate to the light source support, so that the first light of the LED plate forms a light beam.

In some embodiments, the LED light apparatus may include a top fixing ring. The top fixing ring and the light source support clip an inner edge of the light guide for fixing the light guide. In other words, the light source support and the top fixing ring together holds the light guide while allowing the light beam to escape via a central light pass opening of the top fixing ring.

In some embodiments, the light source support is a heat sink device, e.g. made of heat dissipation material like metal, plastic, or combination of multiple materials. The light source support is close to the major heat source and such design helps improve robustness and life span of the LED light apparatus.

In some other embodiments, a LED ring is fixed to the support housing for generating the second light. A LED plate is fixed to the support housing for generating the first light. A fixing ring and the support housing clip the light guide to fix the light guide.

In such design, the support housing provides the function of the light source support directly. The support housing may be made of a one-process molding, thus saving more cost and further improve assembly convenience.

In some embodiments, an exterior lateral wall of the support housing has an inwardly curved shape. In other words, there is a curve line on the exterior lateral side of the support housing, gradually changing its tilt angle to form an inwardly curved shape.

This improves light output, e.g. more light movement from the back side of the light guide, as mentioned above. The exterior wall of the support housing may be applied with a reflective material for further improving overall luminance efficacy.

In some embodiments, a ratio of a lateral height of the support housing to a diameter of the light guide is more than 50%. This makes the LED light apparatus looking like a T shape structure from a lateral view and may be assembled to a light support more conveniently, also increasing overall luminance efficacy.

Figure 6:
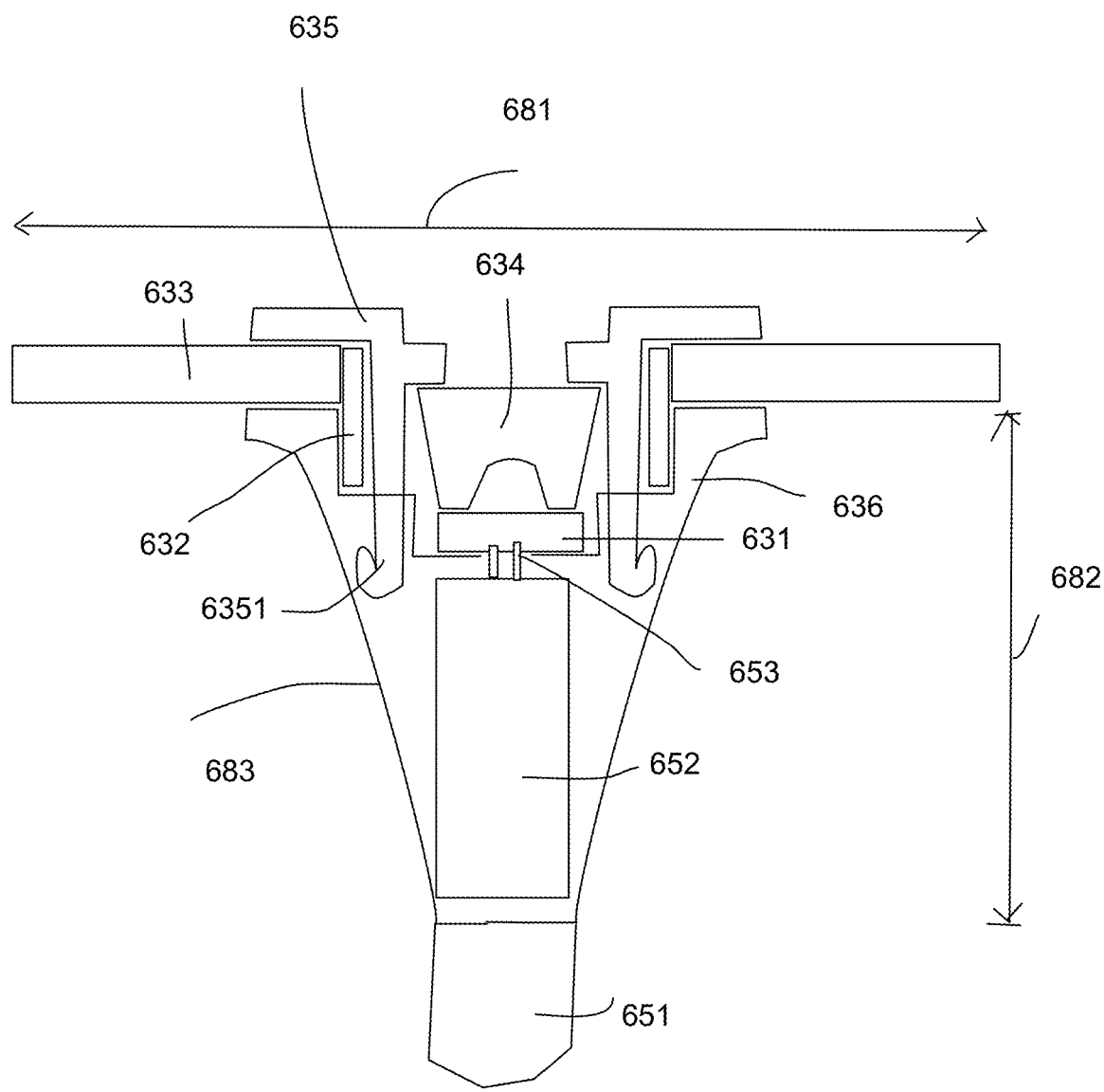
FIG. 6 illustrates component relation in another embodiment.

Please refer to FIG. 6. FIG. 6 shows another embodiment.

In FIG. 6, the LED light apparatus includes a light guide 633 and a beam lens 634 for converting a second light source 632 and a first light source 631 respectively to form a second light and a first light mentioned above.

In this embodiment, a top fixing ring 635 is fixed to the support housing 636 directly with a hook structure 6351. The second light source 632 and the first light source 631 are fixed to the support housing 636 directly, too. The driver plate 652 is plugged to the first light source 631 with elastic plugging terminals 653. There is a cap 651 to be plugged to an external socket like an Edison socket.

An exterior lateral wall 683 of the support housing 636 has an inwardly curved shape. A ratio of a lateral height 682 of the support housing 636 to a diameter 681 of the light guide 633 is more than 50%.

Figure 7:
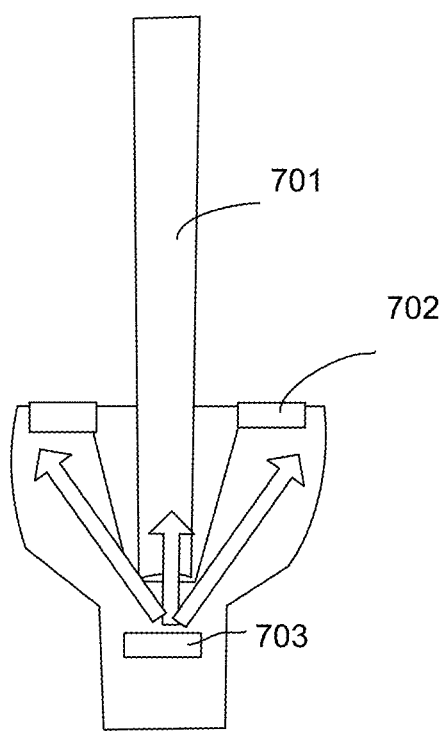
FIG. 7 illustrates another embodiment.

Please refer to FIG. 7, which shows another embodiment with different light source arrangement.

In FIG. 7, only one light source 703 is used for providing both the first light and the second light mentioned above. Instead of using a light guide, a reflective cup or other optical structures may be used so that the second light form a peripheral light 702. In addition, beam lens may be used for generating a light beam 701.

Figure 8:
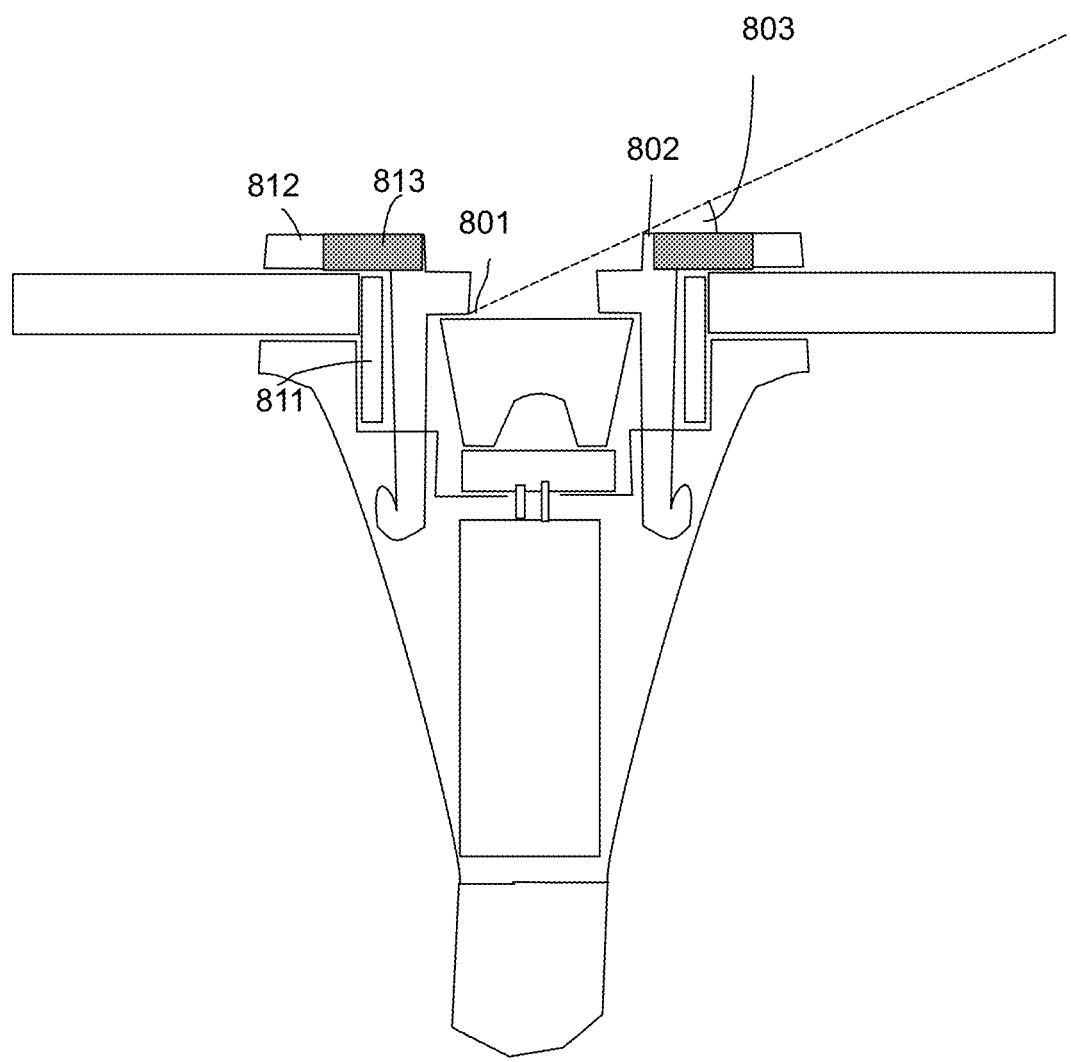
FIG. 8 illustrates additional features of an embodiment.

Please refer to FIG. 8, which is an embodiment having a similar structure as explained in FIG. 6. FIG. 8 is used for explaining two additional features for such embodiments and other embodiments.

The first additional feature is that the beam lens may be kept a distance from a top surface of the LED light apparatus to prevent glare effect which may cause uncomfortable feeling to human eyes. Specifically, when a top surface of the beam lens is lower than a top surface of the LED light apparatus, as illustrated in FIG. 8, the light is restricted in a projection range.

For example, the light from an exposed edge 801 of the beam lens to an opposite edge 802 of light escape hole forms an angle 803 over the top surface of the LED light apparatus. It is found that the angle 803 would be better to keep about 30 degrees to prevent unnecessary glare effect. Preferably, the angle 803 would be proper to be set between 10 degrees to 45 degrees to achieve desired result.

The second additional feature is that a diffusion element 813 disposed on top of the second light source 811 would help prevent undesired dark areas in contrast with bright areas due to separately disposed LED modules. The diffusion element 813 may be a separate element from the fixing ring 812, a part of the fixing ring 812, a layer attached on surface of the fixing ring 812 or any other forms that may help eliminate the dark area visual effect. Please be noted that the dark area is in contrast with bright area, forming an uneven visual effect.

The two additional features may be applied to similar embodiments, not necessary to be the same structure illustrated in FIG. 8.

In addition to the above-described embodiments, various modifications may be made, and as long as it is within the spirit of the same invention, the various designs that can be made by those skilled in the art are belong to the scope of the present invention.

The invention claimed is:

1. A LED light apparatus, comprising:
   a first light module for generating a first light;
   a second light module for generating a second light;
   a central beam module having a beam lens for converting the first light to form a light beam;
   a peripheral light module having a light passing ring, the light passing ring surrounding the beam lens for converting the second light to form a peripheral light, the peripheral light has a lower intensity strength than the light beam;
   a support housing for fixing the first light module, the second light module, the central beam module and the peripheral light module; and
   a cap fixed to the support housing for plugging in an external socket for getting an external power supply, wherein the peripheral light module comprises a light guide for distributing the second light from a LED ring to emit from a front side of the light passing ring, and there is a light guide ring covering an exterior lateral side of the light guide.

2. The LED light apparatus of claim 1, wherein the first light module and the second light module are two separate LED components.

3. The LED light apparatus of claim 1, wherein the light guide also distributes the second light from the LED ring to a back side of the light passing ring.

4. The LED light apparatus of claim 1, wherein the LED ring comprises a ring belt mounted with a second light module, the ring belt surrounds the beam lens, the light guide surrounds the ring belt.

5. The LED light apparatus of claim 1, further comprising a cover ring exposing the beam lens and concealing the LED ring.

6. The LED light apparatus of claim 1, wherein the light guide ring comprises a top ring cover and a bottom ring cover together covering the exterior lateral side of the light guide.

7. The LED light apparatus of claim 1, further comprising a reflective layer on a back side of the peripheral ring for reflecting a part of the second light back to the front side of the light passing ring.

8. The LED light apparatus of claim 1, further comprising a diffusion layer covering the front side of the light passing ring.

9. The LED light apparatus of claim 1, wherein the first light and the second light are controlled separately.

10. The LED light apparatus of claim 1, wherein the first light adjusts according to a status of the second light.

11. The LED light apparatus of claim 1, further comprising a light source support, an exterior wall of the light source support is attached with a LED ring emitting the second light, and an inner bottom of the light source support is attached with a LED plate for emitting the first light.

12. The LED light apparatus of claim 11, wherein the beam lens is fixed above the LED plate to the light source support.

13. The LED light apparatus of claim 11, further comprising a top fixing ring, the top fixing ring and the light source support clipping an inner edge of the light guide for fixing the light guide.

14. The LED light apparatus of claim 11, wherein the light source support is a heat sink device.

15. The LED light apparatus of claim 1, wherein a LED ring is fixed to the support housing for generating the second light, a LED plate is fixed to the support housing for generating the first light, and a fixing ring and the support housing clipping the light guide to fix the light guide.

16. The LED light apparatus of claim 1, wherein an exterior lateral wall of the support housing has an inwardly curved shape.

17. The LED light apparatus of claim 16, wherein a ratio of a lateral height of the support housing to a diameter of the light guide is more than 50%.

18. The LED light apparatus of claim 1, wherein the cap has a corresponding shape to be installed to the external socket of an Edison standard.

* * * * *